March 25, 1958     H. E. McKELVEY     2,827,738
APPARATUS FOR BENDING GLASS
Filed Jan. 28, 1955     2 Sheets-Sheet 1
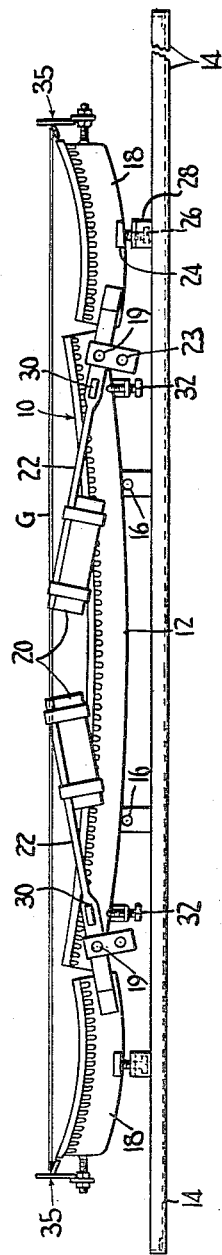
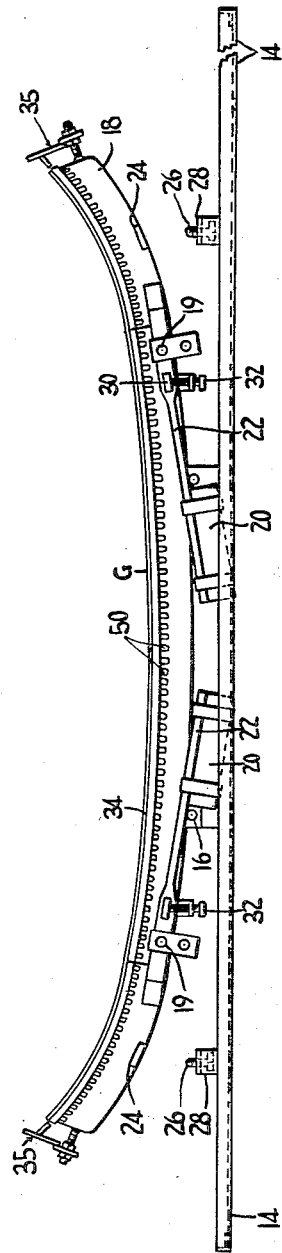
INVENTOR.
HAROLD E. McKELVEY
BY Oscar L. Spencer
ATTORNEY March 25, 1958 H. E. McKELVEY 2,827,738
APPARATUS FOR BENDING GLASS
Filed Jan. 28, 1955 2 Sheets-Sheet 2

INVENTOR.
HAROLD E. McKELVEY
BY
Oscar H. Spencer
ATTORNEY

United States Patent Office 2,827,738
Patented Mar. 25, 1958

2,827,738

APPARATUS FOR BENDING GLASS

Harold E. McKelvey, Rural Valley, Pa., assignor to Pittsburgh Plate Glass Company, Allegheny County, Pa., a corporation of Pennsylvania Application January 28, 1955, Serial No. 484,712

8 Claims. (Cl. 49—67)

This application relates to apparatus for bending glass, and specifically refers to an improvement used to support and guide the location of flat glass on a hinged mold prior to bending.

In bending flat glass sheets into curved shapes, the sheets are cut to size, laid above a skeleton type mold which conforms in contour to the margin of the bent glass sheet, and exposed to gradually increasing heat until the glass sags to conform to the shape of the mold. The mold may be a single unitary structure or composed of a number of mold elements relatively movable with respect to each other into an open position for supporting flat glass sheets and into a closed position wherein the mold elements move together to form a substantially continuous outline defining the margin of the bent glass both in elevation and in curvature. The molds provided with movable elements tend to move to the closed position and have to be opened to receive the flat glass sheets. The movable elements are held in the open position by the dead weight of the flat glass prior to its softening upon the application of heat. According to preferred practice, by counterweighting the end sections of the molds provided with movable elements, the movable end sections are rotated into a closed position whereby the softened glass is shaped to its desired curvature.

When certain shapes of precut glass sheets are mounted on an open mold, it is desirable that the flat glass extend slightly beyond the mold in order to insure that the glass does not fall from its position of support on the mold, and shatter into fragments which disrupt the operation of a bending lehr. However, if the flat glass sheet extends beyond the edge of the mold to a distance greater than about ¼ inch, the glass is marred within its viewing area when mounted in a window frame. This marring is intensified when the weight of the softening glass is borne along a thin line or, in extreme cases, only a point of contact within the marginal periphery of the glass and at each extremity of the mold. Also, the extremities of the heat softened glass overhanging the mold extremities tend to sag in a direction opposite from that desired. This reverse sagging cannot be eliminated by subsequent bending and closing of the mold.

According to the present invention, adjustable support elements comprising spaced tabs aligned to intersect the plane of the flat glass mounted on the open mold are provided to support the longitudinal extremities of the glass extending beyond the longitudinal extremities of the open mold. These support elements also comprise additional tabs extending in a plane angularly disposed relative to the plane of the flat glass sheet to provide an edge bearing guide for locating the extremities of the flat glass.

The amount of metal contacting the glass extremities for guide and support purposes is limited according to the teachings of the present invention. If the tabs touching the glass are too thick, stresses are established in the glass during the bending process. These stresses may result in fracture or in the production of defective bent glass sheets.

Accordingly, it is an object of the present invention to provide an element for use with glass bending molds, which element eliminates reverse sagging and minimizes marring and stressing of glass sheets bent upon such molds.

Another object of the present invention is to provide on a glass bending mold a novel support and guiding element for the extremities of a flat glass sheet.

Another object of this invention is to provide in combination with a glass bending mold an auxiliary element comprising a series of tabs which increase the bearing surface which supports the flat glass adjacent its longitudinal extremities and a number of stop members which guide the longitudinal edges of the flat glass to insure proper alignment of a flat glass sheet upon an open bending mold prior to bending the latter.

Still another object of the present invention is to provide a glass sheet supporting element at each extremity of a bending mold comprising a slotted plate adapted for adjustable securement to an extremity of a bending mold, a number of strips cut from the plate to form a series of tabs alternately extending in angularly disposed planes and adapted to engage and support the under surface and guide the edge of flat glass sheets mounted on the mold for bending.

These and other objects of the present invention will become obvious upon study of a particular embodiment described herein taken in conjunction with the accompanying drawings. It is understood that the particular embodiment disclosed herein is for the purpose of illustration rather than limitation.

In the drawings,

Figure 1 is a longitudinal elevational view showing how the bending mold provided with the particular element comprising the present invention receives a flat sheet of glass prior to bending;

Figure 2 is a view similar to Figure 1 showing the relationship of the bent glass upon the bending mold after the latter has closed to effect the bending of the glass to the desired shape;

Figure 3:
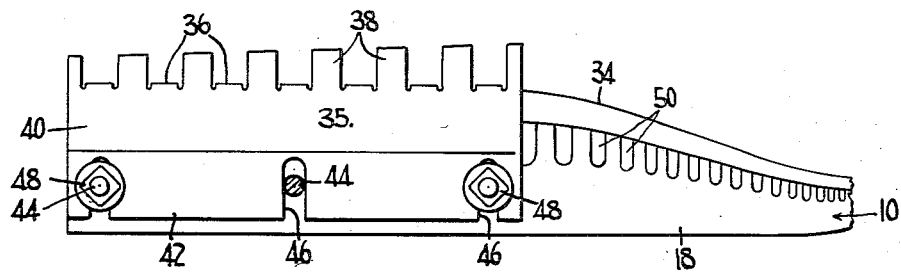
Figure 3 is an end elevational view showing how the element comprising the present invention is attached to the end of a bending mold.
Figure 4:
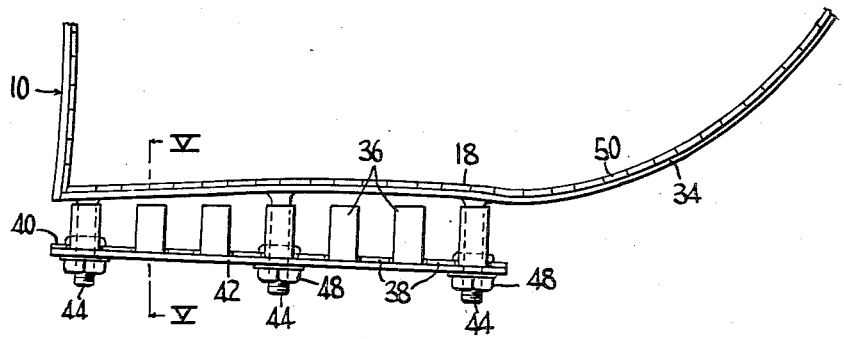
Figure 4 is a plan view of an end portion of the structure shown in Figure 3.
Figure 5:
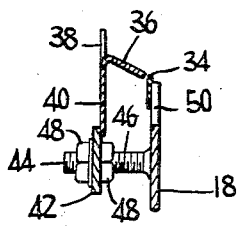
Figure 5 is a sectional view taken along the lines V—V of Figure 4.

Referring to the drawings, a glass bending mold 10 is shown comprising a central mold element 12 fixed to a mold carrying frame 14 at cross-rods 16. Wing members 18 are rotatable about hinges 19 from the closed position shown in Figure 2 to the open position of Figure 1 to receive flat sheets of glass G. Counterweights 20, attached to the wing members 18 by means of counterweight arms 22, provide moments urging the wing members 18 into a closed position. Saddle supports 23 reinforce the hinges 19 by utilizing cross rods spaced as far as possible from the glass in order to avoid establishing stresses due to thermal shock resulting from the proximity of metal to the glass during temperature changes. Ledges 24 on each rotatable wing member and adjustable screws 26 screw threaded through an apertured angular plate 28 fixed to the frame 14 may be provided to insure proper positioning of the mold to receive flat glass. When the ledges 24 abut the adjustable screws 26 upon rotation of the wing members 18 against the rotational moments of the counterweights 20, the mold extremities are aligned in a horizontal plane to receive flat glass. As an alternative, ledges 24, screws 26 and apertured plates 28 may be dispensed with. In such case, the flat glass is supported at the outboard extremities of the wing members 18 and also on either their inboard extremities or the outboard extremities of the fixed central element 12.

Conventional stop members comprising plates 30 extending outwardly from the counterweight arms 22 of wing members 18 and adjustable screws 32 fixed to the fixed central mold element 12 are provided to prevent overbending of the mold. Thus, when the wing members 18 rotate to close the mold during the glass bending process, plates 30 come into contact with adjustable screws 32 to prevent excessive rotation of the wing members 18 relative to the central mold element 12. The upper surface 34 of the mold 10 provides a substantially continuous peripheral frame forming an outline conforming to the shape desired for the bent glass sheet when the counterweighted wing members have rotated into the closed position limited by the stop members.

The present invention comprises the addition of a plate 35 which has been partly slit to form a number of spaced tabs 36 extending in a plane tangential to the wing member outer extremity in the open mold position, each separated by a tab 38 which extends in a plane angularly disposed to the plane defined by tabs 36. This latter plane may be either flat or curved depending upon the contour of the glass sheet periphery.

The extension plate 40 which is slit to provide the angularly oriented sets of tabs may be welded to a slotted reinforcement plate 42, or, in the alternative, the portion of extension plate 40 spaced from the tabbed portion may be slotted. Bolts 44 are welded to the longitudinal extremity of each wing member 18 at the longitudinal extremity of the mold. Adjustment slots 46 located at the opposite extremity of plate 40 from the tabs are spaced to receive the bolts 44. The elevation of the horizontally extending tabs 36 relative to the upper shaping surface 34 at the extremity of the mold is determined by clamping the bolts 44 at a desired location on the slots 46. Adjustment nuts 48 are provided to adjust the spacing of the vertically directed tabs 38 relative to the longitudinal extremities of the mold.

The mold may be provided with apertures 50 to facilitate the escape of air from the surface of the glass if the glass is to be tempered subsequent to the bending operation. This provision enables the glass to be both bent and tempered without removal from the bending mold.

The tabs 36 provide an increased bearing surface for supporting the weight load of the flat glass in a location beyond the extremity of the glass bending mold. In addition, tabs 38 constitute discontinuous frames parallel to each edge of the flat sheet to provide a guide for the proper location of the glass on the open mold. When glass is to be bent to complex curves wherein the radius of curvature varies along an axis, proper initial positioning guided by the tabs 38 insures that the glass is bent in its proper location. Glass bent properly to such complex shapes can be installed subsequently in frames on automobile bodies without causing stresses which tend to fracture the glass during installation or use. Glass improperly aligned on an open mold for complex bending is bent incorrectly and fails to match the contour of the frame for which it is designed. Forcing incorrectly bent glass into a frame with which it is misaligned causes stresses which may fracture the glass.

When glass is bent upon the mold provided with the improved slit extension plates 40 according to the present invention, the previous rigid requirement that the longitudinal dimension of the glass not exceed that of the mold by more than ¼ inch, which was necessitated by the desire to minimize the reverse curvature, is no longer necessary. The tabs 36 provide suitable support for the flat glass sheet extending beyond the open mold exactly at its longitudinal extremities, rather than at points or lines of contact within the glass. Also, by virtue of the additional support provided by these tabs, there is less pressure at the bearing surfaces between the glass and the glass supporting structure of the mold. Hence, there is less marring of the glass as it softens. As the glass bends, its longitudinal extremities slide away from the tabs and come into conformity with the glass bending mold.

In order to avoid marring the glass and imposing stresses at the glass extremities due to the imposition of heat and still provide sufficient structural support for the unbent flat glass, it is necessary that the glass supporting elements be discontinuous. Each tab should not exceed ⅟₁₆ inch in thickness or ¼ inch in width in order to keep its localized metal mass producing distortions in the heat pattern imparted to the glass to a minimum while still providing a rigid support for the glass. When a continuous support ledge having half the thickness of the present tabs was used with a mold on which glass was bent and tempered, the continuous ledge shielded the glass extremity from the blast of tempering fluid and thus established an internal stress within the glass that caused the latter to fracture while tempering. Also, when the glass edge support tabs are separated by more than substantially ¼ inch, the glass extremities develop a rippled edge resembling a pie crust after exposure to heat.

Since bending a glass sheet into a wrap-around shape involves bending the glass to mirror image exactness on either side of its transverse center line, it is exceedingly important that the edge supporting tabs 36 of the plates 40 be sufficiently rigid to support long sheets of flat glass at their extremities without distortion, since any distortion of the glass supporting surfaces introduces sliding friction which inhibits equal sliding of the opposite extremities of the glass sheet onto the mold during the bending operation. Such non-uniform sliding friction is inherent in fabrics or gridded wire supporting structures. It also is important that the tabs 36 have glass supporting surfaces of such smoothness that the glass extremities slide along the tabs into engagement with the mold shaping surface rather easily. Therefore, it is preferable to fabricate the tabbed plates 40 from a material that maintains its rigidity and smooth surface at glass softening temperatures. A suitable material is 18–8 stainless steel, an alloy containing 18% chromium, 8% nickel and the balance substantially completely iron.

While the horizontal tabs 36 are shown supporting the edges of a straight-edged glass sheet, it is understood that glass with pointed or rounded edges may also be edge supported by varying the location of the tabs relative to the mold extremity or by using curved rather than flat plates to form the tabs. Other expedients will be obvious in the light of this disclosure.

What is claimed is:

1. In combination with a glass bending mold comprising an upper shaping surface adapted to conform in elevation and curvature to the shape of a bent glass sheet, means for supporting an extremity of a flat glass sheet mounted for bending on said mold, said means comprising a plurality of closely spaced, rigid, smoothly surfaced, supporting elements, each having a maximum width on the order of ¼ inch and separated from its adjacent elements by a maximum spacing on the order of ¼ inch, located beyond the area embraced by the shaping surface.

2. In combination with a glass bending mold, comprising an upper shaping surface adapted to conform in elevation and curvature to the shape of a bent glass sheet, a plate connected to said mold beyond the area embraced by the shaping surface and a number of closely spaced tabs, each having a maximum width on the order of ¼ inch and separated from its adjacent tabs by a maximum spacing on the order of ¼ inch, extending angularly from said plate in a plane tangential to the plane of the shaping surface at an extremity thereof.

3. In combination with a glass bending mold, comprising an upper shaping surface adapted to conform in elevation and curvature to the shape of a bent glass sheet, a plate connected to the mold beyond the area embraced by the shaping surface, a number of spaced tabs for said plate extending alternately in a first plane and in a plane angularly disposed to the first plane, and means for attaching said plate adjustably to said bending mold.

4. A glass bending mold comprising a U-shaped mold member having an upper curved surface and rotatable into one position to open the mold to receive flat glass and into another position to close the mold to form with another mold member at their curved surfaces a substantially continuous outline corresponding in elevation and curvature to the shape to which the glass is to be bent, and means comprising a plurality of closely spaced, rigid, smoothly surfaced supporting elements, each having a maximum width on the order of ¼ inch and separated from its adjacent elements by a maximum spacing on the order of ¼ inch, located beyond the closed end of the U-shaped mold member.

5. The mold as in claim 4, wherein said last named means comprises a smoothly surfaced plate including a series of tabs extending from the plate alternately in a first plane and in a second plane angularly disposed with respect to the first plane.

6. In a glass bending mold comprising spaced outboard molding members having upper shaping surfaces and relatively movable into an open mold position to receive flat glass and into a closed mold position to form with centrally disposed molding members a substantially continuous outline corresponding in elevation and outline to the shape to which the glas is to be bent, means attached beyond the outboard extremity of each outboard molding member for supporting the opposite extremities of a flat sheet above the mold shaping surface beyond the outboard extremities of the molding members when the flat glass is mounted on the mold for bending, said means comprising a plurality of closely spaced, rigid, smoothly surfaced supporting elements extending in planes tangential to those of the shaping surface at the outboard extremity of each molding member.

7. In apparatus as in claim 6, wherein said means comprises a smoothly surfaced plate provided with a series of tabs extending alternately in a first plane and in a second plane angularly disposed with respect to the first plane.

8. In apparatus as in claim 7, wherein the first plane is tangential to that of the shaping surface at the outboard extremity of the adjacent outboard molding member and the second plane is vertical when the mold is in its open position to receive flat glass.

References Cited in the file of this patent

UNITED STATES PATENTS

| | | |
|---|---|---|
| 2,176,999 | Miller | Oct. 24, 1939 |
| 2,261,023 | Galey | Oct. 28, 1941 |
| 2,518,896 | Jendrisak | Aug. 15, 1950 |
| 2,518,951 | Smith | Aug. 15, 1950 |
| 2,551,606 | Jendrisak | May 8, 1951 |

FOREIGN PATENTS

| | | |
|---|---|---|
| 710,393 | Great Britain | June 9, 1954 |